United States Patent [19]

Kyomen et al.

[11] Patent Number: 4,845,819
[45] Date of Patent: Jul. 11, 1989

[54] METHOD FOR COUPLING TWO PLASTIC CONSTRUCTIVE PARTS USED IN VALVE, JOINT AND PIPE DEVICES

[75] Inventors: Junsuke Kyomen; Masayuki Sakaguchi; Hideki Kajiwara; Keiji Matsumoto; Kenzo Nishitani, all of Sakai; Yoshinori Kawamura, Amagasaki; Katsuro Ishihara, Amagasaki; Masakazu Tanaka, Amagasaki, all of Japan

[73] Assignee: Kubota Limited, Osaka, Japan

[21] Appl. No.: 8,898

[22] Filed: Jan. 30, 1987

[30] Foreign Application Priority Data

Feb. 14, 1986 [JP] Japan ................. 61-031729
Oct. 15, 1986 [JP] Japan ................. 61-245102

[51] Int. Cl.⁴ ........................................... B21K 29/00
[52] U.S. Cl. ..................... 29/157.1 A; 29/157.1 R; 29/447; 264/242; 403/360; 403/361
[58] Field of Search ............. 29/157.1 R, 157.1 A, 29/453, 447; 403/360, 361; 251/75, 369, 904; 24/162; 264/242

[56] References Cited

U.S. PATENT DOCUMENTS

| | | | |
|---|---|---|---|
| 2,832,130 | 4/1958 | Harvey | 29/453 |
| 3,626,978 | 12/1971 | Hoekstra | 29/157.1 R X |
| 3,828,418 | 8/1974 | Laurizio | 29/453 X |
| 3,993,099 | 11/1976 | Nightingale | 29/447 X |
| 4,410,295 | 10/1983 | Ersoy et al. | 29/453 X |
| 4,411,634 | 10/1983 | Hammelmann | 29/447 X |
| 4,532,690 | 8/1985 | Del Bon et al. | 29/453 X |
| 4,650,228 | 3/1987 | McMills et al. | 29/447 X |

Primary Examiner—Mark Rosenbaum
Assistant Examiner—Frances Chin
Attorney, Agent, or Firm—Jordan and Hamburg

[57] ABSTRACT

Two plastic tubelike members on which an annular protrusion or an annular groove are respectively provided to be used as two constructive block members for assembling valve or joint devices are directly coupled to assemble such devices. Critical dimensional relationships on the coupling end having the annular groove are established wherein a deformation process can be controlled to engage the annular groove with the annular protrusion by a radially widening motion and an axially spring motion in elastic dynamics, while the coupling end having the annular groove is softened by heating to become elastic. High coupling accuracy can be secured with high coupling strength and durability.

11 Claims, 10 Drawing Sheets

METHOD FOR COUPLING TWO PLASTIC CONSTRUCTIVE PARTS USED IN VALVE, JOINT AND PIPE DEVICES

BACKGROUND OF THE INVENTION (1) Field of the Invention

This invention relates to a method for coupling two plastic tubelike members to assemble mechanical parts as valve, joint and pipe devices. The two plastic tubelike members on which an annular protrusion or an annular groove are respectively provided are directly coupled by engagement between the annular protrusion and groove, while a part surrounding the annular groove is wholly softened by heating to become elastic, and this produces high coupling accuracy, large coupling force and durability.

(2) Description of the Prior Art

In assembling a diaphragm system valve, bolts F in FIG. 9A or a cylindrical screw G in FIGS. 9B and 9C are used with two plastic constructive parts. In assembling a gate valve, bolts F in FIG. 10A, a cylindrical screw G in FIG. 10B and a coupling ring R in FIG. 10C are used with tubelike members assembling a valve and an operating mechanism. In either cases, assembling cost becomes higher and the coupled part shall be reinforced by thick construction, and a crack may occur on the coupled part on which local stress is applied. That is, rigidity becomes too high in the plastic constructive parts to locally produce a crack because of lost flexibility.

SUMMARY OF THE INVENTION

The object of this invention is to provide a method for coupling two plastic tubelike members to assemble mechanical parts so as to produce various valve, joint and pipe devices.

The object of this invention is to provide a method for directly coupling an annular protrusion and an annular groove which are provided on the two plastic tubelike members respectively, whereby to eliminate the necessity for constructive parts used with a plurality of bolt holes and bolts, a cylindrical screw of high pitch or a coupling metal ring.

The object of this invention is to provide critical conditions in numerical relation for controlling a deforming motion in the coupling process between two plastic tubelike members in a softened elastic state of the tubelike member, so that the annular protrusion and the annular groove are directly coupled by engagement between them.

The object of this invention is to provide a method for controlling a deforming motion in the directly coupling process, wherein the process controls the portion surrounding the annular groove to act in a radial widening motion and an axial spring motion in elastic dynamics in response to the inserting movement of the annular protrusion, thereby resulting in high coupling accuracy.

The object of this invention is to provide a method for coupling two plastic constructive parts directly by compatibly establishing a condition for completing a coupling process successfuly and a condition for enabling a directly coupled part to have high accuracy, coupling force and durability.

The object of this invention is to provide a method for coupling plastic members used to assemble pipe devices such as a gate type valve, a diaphragm system valve, a strong union type joint, durably or loosely for each purpose.

DETAILED DESCRIPTION OF THE PREFERRED EMBODIMENT

Figure 1:
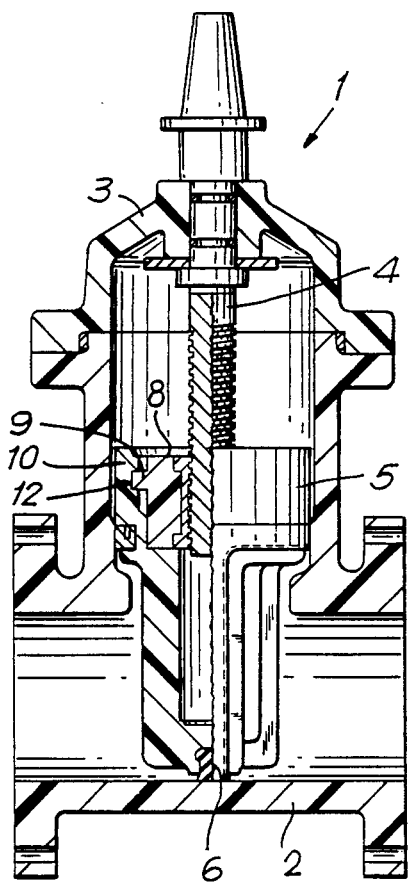
FIG. 1 shows a gate valve in sectional view, which is assembled by the present method.

In the method of this invention, a radial widening motion and axial spring motion are concurrently useful in a balance which occurs elastic dynamically, when a female plastic tubelike member 5 on which an annular groove 12 was formed was inserted therein a male plastic tube-like member 8 on which an annular protrusion 9 was formed, in axial direction in order to couple and engage the groove and protrusion, referring to FIGS. 6A—6E. In case of the deforming motion can not be controlled even if such motion were urged elastically, crushing raises at the part surrounding the annular groove, referring to FIGS. 6D and 6E, and the coupling process ends in failure.

An open end 10 of the female member 5 on the inner face of which the annular groove 12 is formed has a critical condition in numerical relation between the axial thickness C thereof, the groove wall thickness B and the groove depth A as follows:

$$3A \geq B > \tfrac{1}{2}A \text{ and } 5A \geq C \geq \tfrac{1}{2}A;$$

and preferably $$2A \geq B > \tfrac{1}{2}A \text{ and } 2A \geq C \geq A$$

Figure 6A:
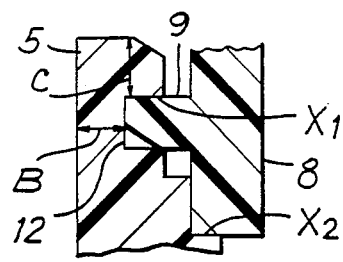
FIGS. 6A, 6B, 6C, 6D, and 6E show the presence of a critial condition in numerical relation at the portion surrounding the annular groove in partially sectional view.
Figure 6B:
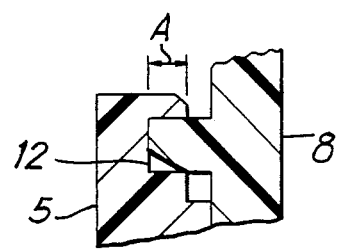
Figure 6C:
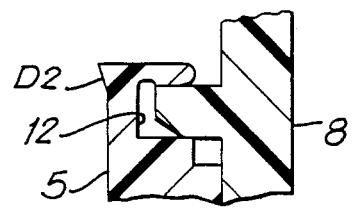
Figure 6D:
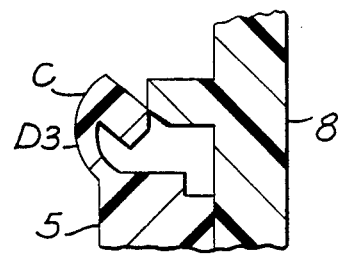
Figure 6E:
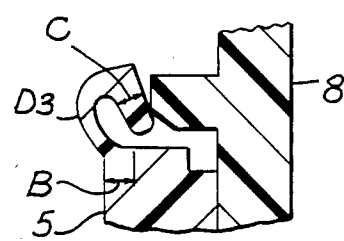

Outside the critical condition, elastical deforming motion could not be controlled to balance the radially widening motion and the axially spring motion thereby to crush the open end 10 of the female member 5 as shown in FIGS. 6D or 6E. While the axially spring motion occurs normally at the axial wall of the annular groove 12, this motion is supporting to urge the open end 10 to cause the radially widening motion in response to inserting movement of the protrusion until the annular protrusion 9 falls in the groove 12.

When the axial thickness C of the open end 10 is thinner than that equivalent to the groove depth A, the open end 10 crushes into the annular groove 12.

The groove depth A is equal to the axial direction thickness of the protrusion 9 as a standard relation. Even if the thickness C becomes larger, for example, twice, three times, . . . five times (preferably up to five times) larger than that equivalent to the groove depth A, crushing can be prevented under elastically dynamic motion in balance of the radial and axial actions for performing the deforming control.

The groove depth A and axial thickness of the protrusion 9 are previously determined corresponding to the necessary coupling force, and real sizes for designing the open end and the annular groove 12 are determined based on them according to the critical condition. When the groove wall thickness B is more than $\frac{1}{2}$ of the depth A, deformation control obtained here is actuated. When it is equal to or less than $\frac{1}{2}$, crushing deformation in FIGS. 6C, 6D and 6E occurs. That is, even if the edge part were retained normally, the wall part was constricted to prevent the protrusion 9 from being inserted into the groove.

The elastic deforming motion of the plastic tubelike member 5 in a state of elasticity due to heating will not cause a horn type deformation balancing the radial widening deformation motion and axial spring deformation motion under the critical condition above. This is seen like "going through" the protrusion 9 in the cylindrical wall of the open end, and the cylindrical wall seems to continue to receive the protrusion 9. Such a continuous deforming motion is by application of the elastic force of the groove wall B in the axial direction. Surely the groove wall B is not bent backward. As shown in FIG. 6, a face (XI) of protrusion 9 is fit to the upper wall face (X1) of the annular groove 12 without clearance, and there is no clearance is between the lower end face (x2) of the member 8 and an engaging face (X2) of the member 5 in the lower end. This coupling accuracy can have a clearance within 0.5 mm when the axial length of the member 5 is 10 cm. When the annular groove is made as a V-shaped groove instead of rectangular space, deformation control is performed by a motion bending the open end part outside into a horn type. It is very difficult to control the coupling process by bending deforming as long as the groove has an axial face in the rectangular shape.

FIG. 6A shows a coupling result when A:B:C=1:1:1. FIG. 6B shows the result at the time of A:B:C=1:1:$\frac{1}{2}$. The coupling was correctly completed. FIG. 6C shows the result at the time of A:B:C=1:1:$\frac{1}{3}$, and deformation abnormality D2 occurred on the upper wall of the groove. FIG. 6D shows the coupling at the time of A:B:C=1:$\frac{1}{2}$:1, and in this case, constriction D3 occurred on the groove wall. When thickness B is larger than $\frac{1}{2}$ of the depth A, "constriction" is prevented. FIG. 6E is the coupling at the time of A:B:C=1:$\frac{1}{2}$:$\frac{1}{2}$, and deformation control does not work. Of course, there are other factors by which the elastic-dynamic motion would be unbalanced, however, the critical condition in proportional relation mentioned above successfuly controls the coupling process.

The upper limitation of the radial wall thickness B of the annular groove 12 is three times the groove depth A. The elastic motion control can be obtained, but the groove depth will be insufficient relative to the thickness of the plastic tubelike member. Thus, the thickness B is preferably limited by $2A \geq B > \frac{1}{2}A$ to obtain a good coupling force and to get the elastic motion control.

The axial thickness C of the open end 10 is limited by $5A \geq C \geq \frac{1}{2}A$, preferably $2A \geq C \geq A$. Thermal control becomes very difficult when the open end 10 is too large to have the axial thickness C more than five times the groove depth A. At $2A \geq C \geq A$, the most reliable control may be secured. And furthermore, the axial distance of the open end part 10 to a position of the annular groove 12 is limited to within two times the diameter of the tubelike member, preferably the distance being the same as the diameter. By such limitation, thermal control is efficiently maintained during the coupling process to cause the elastic motions to be balanced in the radial and axial directions.

FIG. 1 shows a sectional view of a synthetic resin gate valve manufactured by a method of this invention. In FIG. 1, 2 is a valve housing, 3 is a cap, 4 is a valve rod having a male screw 4a on the outer periphery thereof, 5 is a valve and 6 is a packing mounted on the valve 5, and a rotor 8 formed with the male screw 4a of the valve rod 4 is assembled in the valve 5 by the method of this invention. The constructive block members are the valve 5 and the rotor 8 supporting the valve rod, respectively.

Figure 2A:
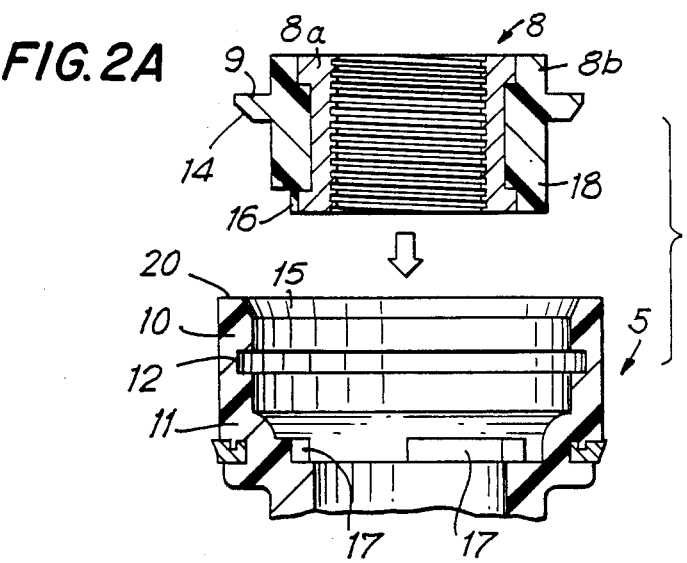
FIGS. 2A, 2B, and 2C show the coupling process of the method used in FIG. 1 in sectional view.
Figure 2B:
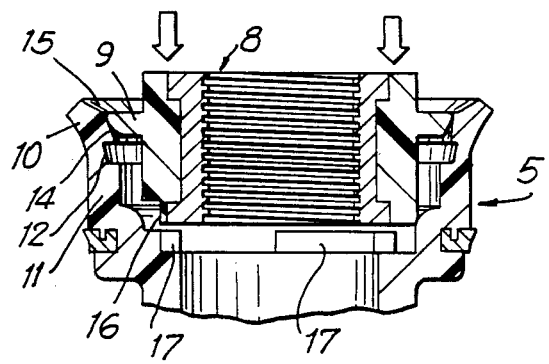
Figure 2C:
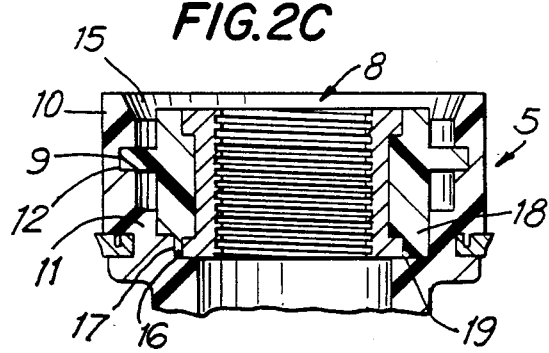
Figure 5:
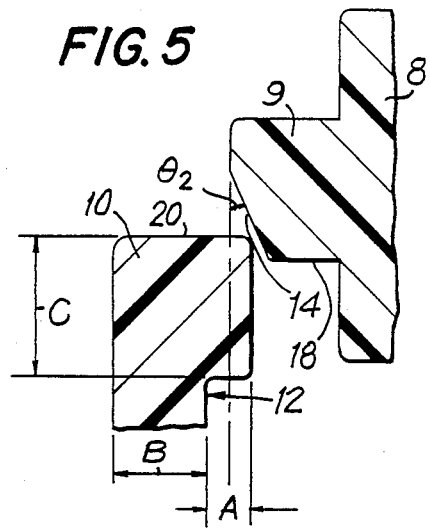

FIGS. 2A–2C are enlarged sectional views of the principal parts providing the process of assembling the rotor in the valve 5 in sequential series by the method of this invention. In FIG. 2A, 5 is a female value part of a polyvinyl chloride resin formed by injection molding, and an annular groove 12 is formed on the inner peripheral face of an open end part 10, and a chamfering taper 15 is formed on the inner peripheral edge of the open edge part. The rotor 8 is a male body anchored on the outer peripheral face of the engraved member 8a of the metal female screw by injection molding of a polyvinyl chloride resin member 8b, and annular protrusion 9 is formed on the outer peripheral face of the rotor 8 and a chamfering taper 14 is formed on the outer peripheral edge of the protrusion 9.

And concave parts 16, 16 . . . for coupling are provided on the outer periphery of the lower end 18 of the rotor 8, and correspond to the convex parts 17, 17 . . . for coupling the lower end of the inner periphery of the coupled parts 11 of the valve 5.

In inserting to assemble the rotor 8 in the valve 5, the open end part 10 of the valve 5 is heated to 120°~150° C. and softened to be in a rubberlike elastic condition. The heating is made by a well known method such that the open end part 10 is inserted in a heater thereby to soften the part 10 from the open end to the annular groove 12. Uniform heating from the open end face 20 to the depths of the annular groove 12 is desirable. Next, when pushing the rotor 8 in the arrow direction from the open end of the valve 5, a chamfering taper 14 of the annular protrusion 9 contacts a chamfering taper 15 of the open end part of the valve 5 and widens the radius of the open end part 10 in the rubberlike elastic condition as shown in FIG. 2B. When continuing to insert the rotor 8 in the arrow direction, the protrusion 9 is put in the groove 12 and the concave parts 16, 16, . . . for coupling of the rotor 8 are coupled with the convex parts 17, 17, . . . for coupling of the valve 5, and the lower end 18 of the rotor 8 is contacted to the wall 19 of the valve 5, and pushing is completed. This time, the open end part 10 of the valve 5 is in a rubberlike condition as in FIG. 2C, and the internal stress of constriction which was regulated at the time of injection molding is released to generate a little constriction, and the rotor 8 is assembled between the open end part 10 and the wall of the valve 5 in pushed condition without clearance. Therefore, high assembling accuracy is obtained.

In enforcement of this invention, deformation control which was performed in insertion of the male body into the open end part in rubberlike condition is an important point, and this point was explained in detail in referring to FIGS. 6A~6E.

Figure 3:
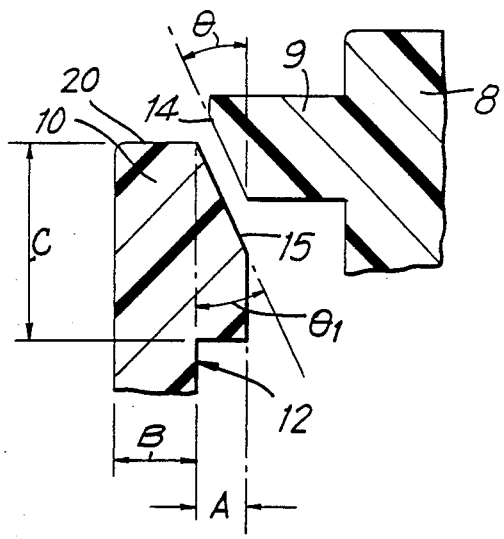
FIG. 3 shows two constructive parts at the time of starting of the coupling process in partially sectional view.

FIG. 3 is a sectional view of enlarged part of the open end part 10 of the valve 5 and the protrusion 9 of the rotor 8 in the example of enforcement. In this, chamfering taper 15 is formed on the inner peripheral edge of the open end part 10 and the chamfering taper 14 is on the outer peripheral edge of the protrusion 9 as described before, and angles $\theta_1$, $\theta_2$ of respective chamfering tapers are made 20° respectively. And the relation among the radial distance C between the open end face 20 of the open end part 10 to the groove 12, the groove depth A of the groove part 12 and the groove bottom wall thickness B is given as $3A \geq B > \frac{1}{2}A$ and $5A \geq C \geq \frac{1}{2}A$; and $2A \geq B > \frac{1}{2}A$ and $2A \geq C \geq A$, and they are formed on this relation. Insertion of the rotor 8 into the valve 5 under this relation brings favorable deformation control against the open end part 10 which is in a rubberlike elastic condition to realize high accurate direct coupling. Formation of the groove 12 on the inner peripheral face of the open end part 10 makes thinner the open end part 10, which promotes crushing deformation and bending deformation. However, when the relation among axial distance C from the open end face 20 to the groove 12, the depths A of the groove 12 and the bottom wall thickness B of the groove is made to be $3A \geq B > \frac{1}{2}A$ and $5A \geq C \geq \frac{1}{2}A$, preferably $2A \geq B > \frac{1}{2}A$ and $2A \geq C \geq A$, such crushing deformation and bending deformation can be restrained. By the chamfering tapers formed, deformation control against the open end part 10 is made smoothly by partial pushing force and a deforming force is effected outwardly to urge a radially widening motion.

Figure 4:
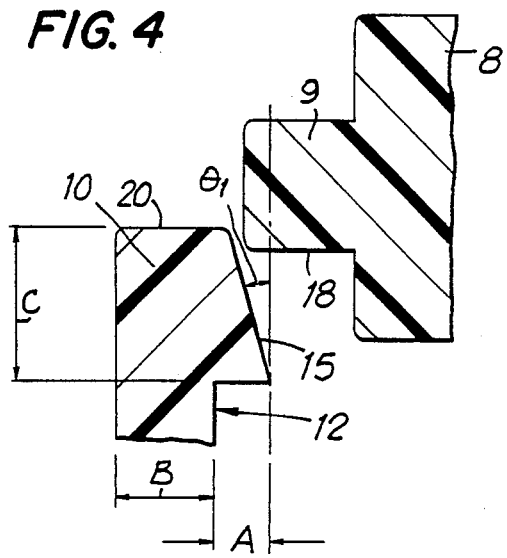
FIGS. 4 and 5 show respectively other examples different from that of FIG. 3.

FIGS. 4 and 5 are sectional views of enlarged principal parts of the open end parts 10 and protrusion 9 in another example. In FIG. 4. the chamfering taper 15 is formed only on the inner peripheral edge of the opened end part 10 and a chamfering taper is not formed on the outer peripheral edge of the protrusion 9, and in FIG. 5, the chamfering taper 14 is formed on the outer peripheral edge of the protrusion 9 and a chamfering taper is not formed on the inner peripheral edge of the opened end part 10. Similarly as in FIG. 3, the relation of $3A \geq B > \frac{1}{2}A$ and $5A \geq C \geq \frac{1}{2}A$, preferably $2A \geq B > \frac{1}{2}A$ and $2A \geq C \geq A$ is satisfactory for desirable deformation to the open end part 10 in FIGS. 4 and 5.

The angles $\theta_1$, $\theta_2$ of the chamfering tapers in the examples of FIGS. 4 and 5 should be 45° or less so as to increase the partial force outwards for smooth motion in a radial direction, and crushing deformation will be prevented.

As described above, a example of application of the method of this invention to the valve body of the gate valve is given, however this invention is not necessarily limited to the example. That is, if an open end part of a female body is at least made of thermoplastic resin member such as polyvinyl chloride, polystyrene, polycarbonate, polypropylene etc having a nature in which the part is heated and softened to be in a rubberlike elastic condition, this invention can be applied, and it is possible to apply it not only to the valve body of a gate valve, but to assembling of various shapes of member, and furthermore no limitation is given to the material and shape even for the male body to be inserted. Formation of a plurality of grooves on an inner peripheral face of a female body and formation of a plurality of protrusions on an outer peripheral face of a male body can also be applied in place of the annular protrusion and groove.

Furthermore, the shape of an open end part of a female body is not necessarily limited to be cylindrical and even if it is hexagonal or octagonal, a method of this invention can be applied.

Figure 7A:
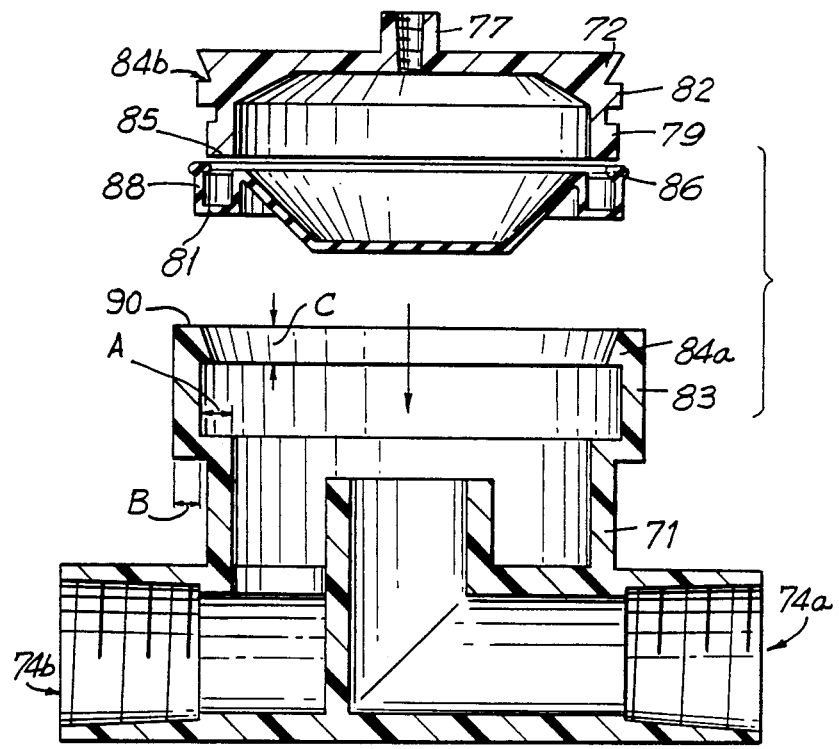
FIG. 7A shows a diaphragm system valve assembled by the present method in sectional view.
Figure 7B:
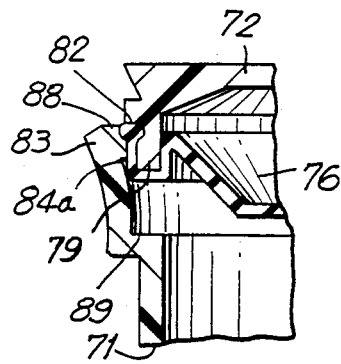
FIGS. 7B and 7C show respectively the intermediate and final states of the process in partially sectional view.
Figure 7C:
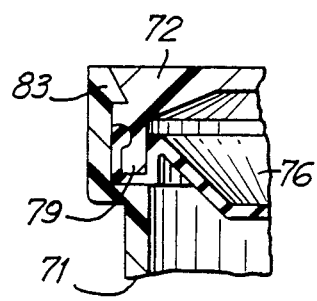
Figure 8A:
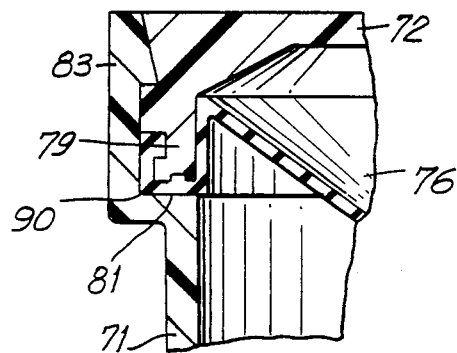
FIGS. 8A and 8B show respectively other examples different from that of FIG. 7A.
Figure 8B:
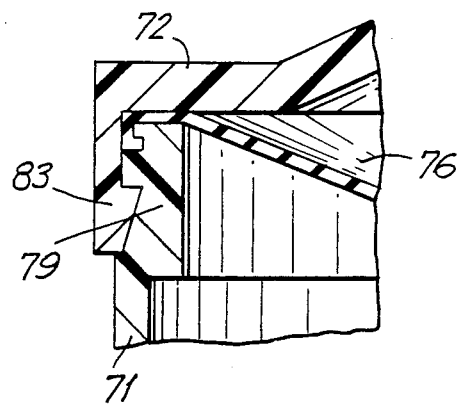
Figure 9A:
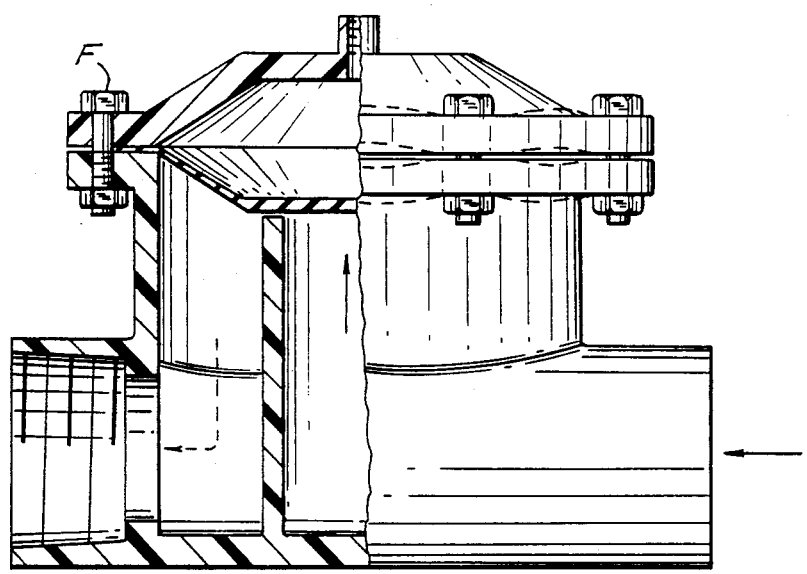
FIGS. 9A, 9B and 9C show conventional assembles of a diaphgram valve.
Figure 9B:
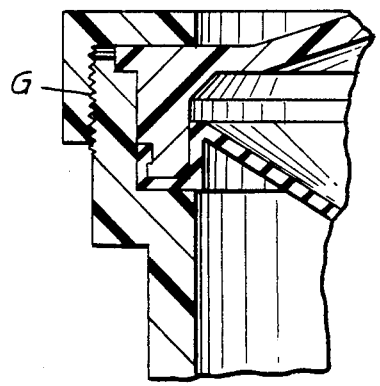
Figure 9C:
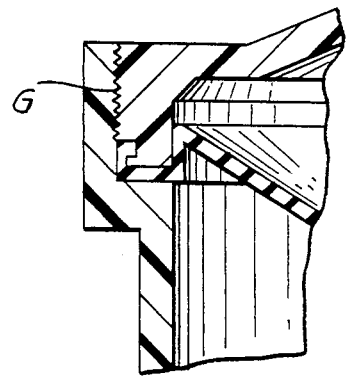
Figure 10A:
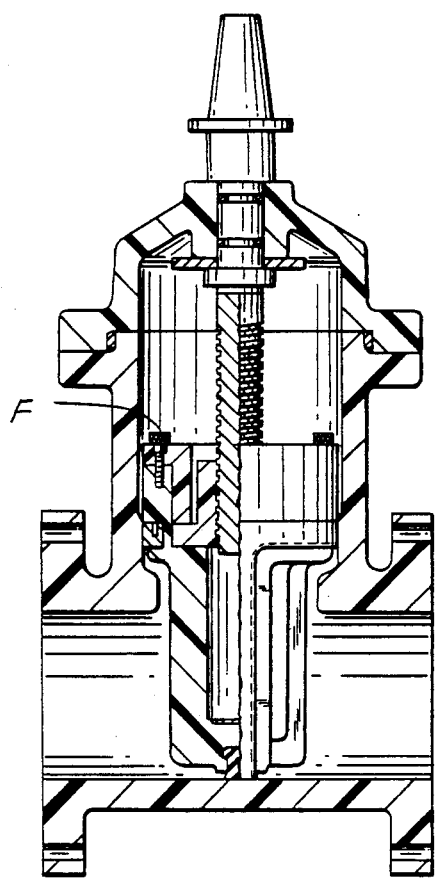
FIGS. 10A, 10B and 10C show conventional assembles of a gate valve.
Figure 10B:
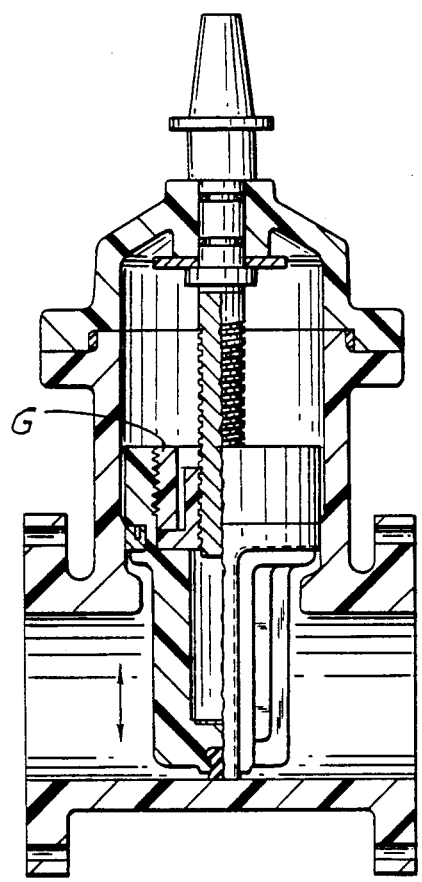
Figure 10C:
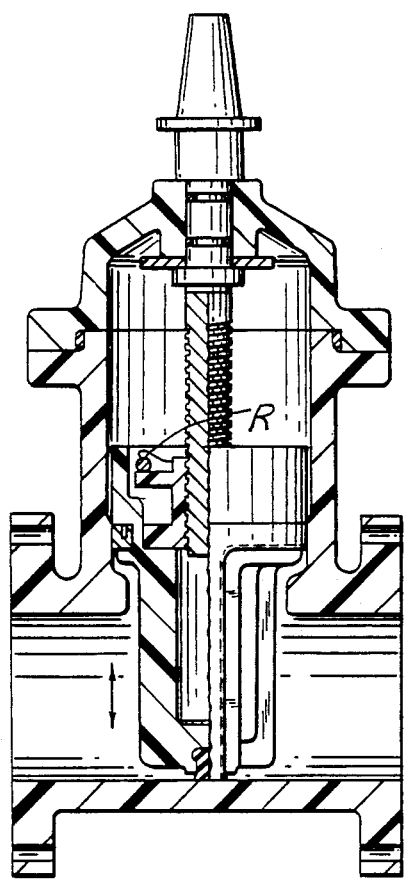

FIGS. 7A-7C are sectional drawings showing assembling process of another valve by this invention. Faucets 74a, 74b for connecting pipes are formed on the lower portion of a valve body 71, and a cylindrical female body 83 is formed on the upper portion. And an inner peripheral face side annular coupling part 84a is protruded on the inner peripheral face of the female body 83 to form an annular groove.

A male body 79 is annularly formed on the lower portion of an upper lid 72 and an outer peripheral side annular coupling part 84b of concave groove shape is formed on the outer periphery of the male body 79 to form an engaging protrusion. And a facing side annular coupling part 85 is formed on the end part of the male body 79, and coupled to a concave groove shape annular coupling part 81 formed on the peripheral edge of a diaphragm. And O-ring 86 of the outermost peripheral edge of the diaphragm 76 is inserted in the outer peripheral groove 82 of the male body 79 and the diaphragm outer peripheral edge is arranged so as to wrap the end part of the male body 79.

After coupling the upper lid 72 and the diaphragm 76, they are coupled into the valve body 71 as shown by the chainline arrow, however in this condition, coupling resistance of the male body 79 and the female body 83 is too large as described above, and coupling is not made wall. Therefore, the open end part of the female body 83 is heated to 120°-150° C. and softened to be in a rubberlike elastic condition. The heating is performed by a well-known method of inserting the open end part into a heater, and in this case uniform heating from the open end face 90 of the female body to the depths of the annular groove 83 is desirable.

While, lubricant is put to the diaphragm outer periphery 88. The kind of the lubricant is not limited, but typically liquid silicon oil or powder coal is used. The friction coefficient of the diaphragm formed by rubber whose friction resistance is large and the inner peripheral face of the female body 83 whose friction resistance is increased by heating, but such frictional resistance is improved by the use of lubricant.

In the case of handling a synthetic resin which is heated and softened to be rubberlike elastic, control of the rubberlike elasticity in the coupling step is extremely difficult. Much failure before development of this invention were caused by not effecting insertion of the protrusion of the male body into the groove of the female body coupling part. Destruction of the female body groove is found to be caused by uncontrollable competition of the hard protrusion and the groove in a rubberlike elastic state, such that ideal direct coupling of the groove and the protrusion depends on how to control deforming motion against the rubberlike elastic groove. The critical conditions mentioned above can realize deformation control required to obtain highly accurate coupling.

FIG. 7B shows the condition in which the coupled part of the upper lid 72 and the diaphragm has begun to be pushed into the female body 83 according to the above condition. The inner peripheral face side annular coupling part 84a to be contacted to the diaphragm outer peripheral face 88 is radially widened in the peripheral direction and pushed to be expanded. Here chamfering tapering up to 45° is applied to the female body open part and the male protrusion, and smooth coupling is promoted. When the diaphragm face on the tip side of the male body 79 reaches the seal part 89 of the female body 83, coupling of the female body 83 and the male body 79 is completed and the tip part of the female body 83 radially widened is restored to the original shape immediately according to the shape memory effect, and the outer peripheral side coupling part 84a of the male body is coupled to fit to the inner peripheral face side annular coupling part 84b of the female body as in FIG. 7C. Provided that, when the relation among the receiving groove depth A of the female faucet, coupling wall thickness B and flange part C is as follows $B \leq \frac{1}{2}A$, $C < \frac{1}{2}A$, restoration of the female flange part to the original shape becomes insufficient, and a radial widening phenomenon is irregularly generated. As long as the coupling process is controlled in the critical condition, the outer peripheral edge of the diaphragm 7 6 is surely contacted between the male body 79 and the female body 83 and punched.

What is claimed is:

1. A method of coupling and assembling two plastic members comprising:

forming a first internal cylindrical part with an annular groove on one of said members, said annular groove being formed axially inwardly of one axial end of said first internal cylindrical part thereby defining an axial end section between said annular groove and said one axial end of said first internal cylindrical part, said axial end section having a radial depth (A) measured radially inwardly from the bottom of said annular groove, said first internal cylindrical part having a radial wall thickness (B) measured radially outwardly from the bottom of said annular groove, and said axial end section having an axial length (C) with the relative relationship between (A), (B), and (C) being within the range of $3A \geq B > \frac{1}{2}A$ and $5A \geq C \geq \frac{1}{2}A$;

forming a second external cylindrical part with an annular protrusion on the other of said members such that the annular protrusion has a configuration conforming generally to the configuration of said annular groove;

heating and softening said axial end section of said first internal cylindrical part such as to impart a softened elastic state to said axial end section;

forcibly inserting said second external cylindrical part along with its annular protrusion into said axial end section while said axial end section is in said softened elastic state;

temporarily radially widening said axial end section by said prior forcible insertion step; and positioning said annular protrusion in said annular groove as said axial end section returns to its initial unwidened configuration, thereby effecting coupling and assembling of the two plastic members.

2. A method according to claim 1, wherein the relatively relationship between (A), (B), and (C) is within the range of $2A \geq B > \frac{1}{2}A$ and $2A \geq C \geq A$.

3. A method according to claim 1, wherein said two plastic members form part of a valve assembly.

4. A method according to claim 3, wherein said one member is a moveable valve closure element and said other member supports a valve operating mechanism which is operable to move said moveable valve closure element.

5. A method according to claim 3, wherein said other member is a moveable valve closure element and said one member supports a valve operating mechanism which is operable to move said moveable valve closure element.

6. A method according to claim 1, wherein said first internal cylindrical part is made from a material selected from the group consisting of polyvinyl chloride, polystyrene, polycarbonate and polypropylene.

7. A method according to claim 1 further comprising forming said annular protrusion with an outer radial conical surface with the diameter of said conical surface progressively increasing as one axial end of said second external cylindrical part is approached, the last said one axial end being the axial end first inserted into said elastic axial end section of said first internal cylindrical part during said forcible insertion step, said conical surface providing for progressive widening of said elastic axial end section during said forcible insertion step.

8. A method according to claim 1 further comprising forming said axial end section and said annular protrusion with respective conical surfaces such as to have a supplementary relationship face to face, said one conical surface having the diameter progressively decreasing on said axial end section as the axial end section of said first internal cylindrical part is approached, and said other conical surface having the diameter progressively increasing on said annular protrusion as one axial end of said second external cylindrical part is approached and first inserted into said elastic axial end section of said first internal cylindrical part during said forcible insertion step, said conical surfaces providing for progressive widening of said elastic axial end section during said forcible insertion step.

9. A method of coupling two plastic valve members for use in an assembled valve comprising:

forming a first internal cylindrical part with an annular groove on one of said valve members, said annular groove being formed axially inwardly of one axial end of said first internal cylindrical part thereby defining an axial end section between said annular groove and said one axial end of said first internal cylindrical part, said axial end section having a radial depth (A) measured radially inwardly from the bottom of said annular groove, said first internal cylindrical part having a radial wall thickness (B) measured radially outwardly from the bottom of said annular groove, and said axial end section having an axial length (C) with the relative relationship between (A), (B), and (C) being within the range of $3A \geq B > \frac{1}{2}A$ and $5A \geq C \geq \frac{1}{2}A$;

forming a second external cylindrical part with an annular protrusion on the other of said members such that the annular protrusion has a configuration conforming generally to the configuration of said annular groove;

heating said axial end section of said first internal cylindrical part such as to impart a softened elastic state to said axial end section;

forcibly inserting said second external cylindrical part along with its annular protrusion into said axial end section while said axial end section is in said softened elastic state;

temporarily radially widening and increasing the diameter of said axial end section by said prior forcible insertion step;

positioning said annular protrusion in said annular groove as said axial end section returns to its initial unwidened configuration, thereby effecting coupling of the two plastic valve members; and assembling the remainder of the valve parts to form a completely assembled valve.

10. A method of coupling and assembling two plastic members forming part of a valve assembly comprising:

forming a first internal cylindrical part with an annular groove on one of said members, said one member being a valve housing, said annular groove being formed axially inwardly of one axial end of said first internal cylindrical part thereby defining an axial end section between said annular groove and said one axial end of said first internal cylindrical part, said axial end section having a radial depth (A) measured radially inwardly from the bottom of said annular groove, said first internal cylindrical part having a radial wall thickness (B) measured radially outwardly from the bottom of said annular groove, and said axial end section having an axial length (C) with the relative relationship between (A), (B) and (C) being with the range of $3A \geq B > \frac{1}{2}A$ and $5A \geq C \geq \frac{1}{2}A$;

forming a second external cylindrical part with an annular protrusion on the other of said members such that the annular protrusion has a configuration conforming generally to the configuration of said annular groove, said other member mounting a diaphragm juxtaposed to said annular protrusion;

heating and softening said axial end section of said first internal cylindrical part such as to impart elasticity to said axial end section;

forcibly inserting said second external cylindrical part along with its annular protrusion into said axial end section of said first internal cylindrical part;

temporarily radially widening said axial end section by said prior forcible insertion step; and positioning said annular protrusion in said annular groove as said axial end section returns to its initial unwidened configuration, thereby effecting coupling and assembling of the two plastic members.

11. A method of coupling and assembling two plastic members forming part of a valve assembly with one of said members being a valve housing comprising:

forming a first internal cylindrical part with an annular groove on one of said members, said annular groove being formed axially inwardly of one axial end of said first internal cylindrical part thereby defining an axial end section between said annular groove and said one axial end of said first internal cylindrical part, said axial end section having a radial depth (A) measured radially inwardly from the bottom of said annular groove, said first internal cylindrical part having a radial wall thickness (B) measured radially outwardly from the bottom of said annular groove, and said axial end section having an axial length (C) with the relative relationship between (A), (B), and (C) being within the range of $3A \geq B > \frac{1}{2}A$ and $5A \geq C \geq \frac{1}{2}A$;

forming a second external cylindrical part with an annular protrusion on the other of said members such that the annular protrusion has a configuration conforming generally to the configuration of sid annular groove;

heating and softening said axial end section of said first internal cylindrical part such as to impart elasticity to said axial end section;

forcibly inserting said second external cylindrical part along with its annular protrusion into said axial end section of said first internal cylindrical part;

temporarily radially widening said axial end section by said prior forcible insertion step;

positioning said annular protrusion in said annular groove as said axial end section returns to its initial unwidened configuration, thereby effecting coupling and assembling of the two plastic members, and disposing a diaphragm between said first internal cylindrical part and said second external cylindrical part such that said diaphragm is disposed between said two members when said two members are in their coupled and assembled condition.

* * * * *